(12) United States Patent
Park et al.

(10) Patent No.: US 8,437,393 B2
(45) Date of Patent: May 7, 2013

(54) METHOD FOR ESTIMATING CONTOUR OF VIDEO OBJECT

(75) Inventors: Young-O Park, Seongnam-si (KR); Kwan-Woong Song, Seoul (KR); Young-Hun Joo, Yongin-si (KR); Kwang-Pyo Choi, Anyang-si (KR); Yun-Je Oh, Yongin-si (KR); Chang-Su Kim, Seoul (KR); Jae-Kyun Ahn, Seoul (KR)

(73) Assignees: Samsung Electronics Co., Ltd., Samsung-ro, Yeongtong-gu, Suwon-si, Gyeonggi-do (KR); Korea University Industrial Academic Collaboration Foundation, Seongbuk-Gu, Seoul (KR)

( * ) Notice: Subject to any disclaimer, the term of this patent is extended or adjusted under 35 U.S.C. 154(b) by 1130 days.

(21) Appl. No.: 12/363,812

(22) Filed: Feb. 2, 2009

(65) Prior Publication Data
US 2009/0196349 A1    Aug. 6, 2009

(30) Foreign Application Priority Data
Feb. 1, 2008   (KR) .......................... 10-2008-0010667

(51) Int. Cl.
H04N 7/12 (2006.01)
G06K 9/00 (2006.01)

(52) U.S. Cl.
USPC ..................................... 375/240.12; 382/103

(58) Field of Classification Search ................. 382/103, 382/164, 173; 375/240.12; H04N 7/12; G06K 9/00
See application file for complete search history.

(56) References Cited

U.S. PATENT DOCUMENTS

| | | | |
|---|---|---|---|
| 6,546,117 B1 * | 4/2003 | Sun et al. | 382/103 |
| 7,706,610 B2 * | 4/2010 | Zhang et al. | 382/173 |
| 7,720,283 B2 * | 5/2010 | Sun et al. | 382/173 |
| 8,103,093 B2 * | 1/2012 | Blake et al. | 382/164 |

OTHER PUBLICATIONS

Rother, Carsten, et al.; "'GrabCut'—Interactive Foreground Extraction Using Iterated Graph Cuts;" ACM Transactions on Graphics, vol. 23, No. 3; 2004.

Boykov, Yuri, et al.; "Interactive Graph Cuts for Optimal Boundary & Region Segmentation of Objects in N-D Images;" Proc. Int. Conf. on Computer Vision, vol. 1; Jul. 2001.

Boykov, Yuri, et al.; "An Experimental Comparison of Min-Cut/Max-Flow Algorithms for Energy Minimization in Vision;" IEEE Trans. Pattern Analysis and Machine Intelligence, vol. 26, No. 9; Sep. 2004.

* cited by examiner

Primary Examiner — Gims Philippe
(74) Attorney, Agent, or Firm — Cha & Reiter, LLC (57) ABSTRACT

A method for estimating a boundary between a background and a user object in a video, in which the user object is segmented from the background is provided. The initial object contour is estimated in a first video frame for object segmentation, and color probability density functions are estimated for the user object and the background segmented from the first video frame. An edge strip with a predetermined width is generated in a current frame based on an object contour of a previous frame, and a coherence probability density function of the edge strip is estimated. The user object is segmented in the current frame by energy minimization.

16 Claims, 7 Drawing Sheets

METHOD FOR ESTIMATING CONTOUR OF VIDEO OBJECT

CLAIM OF PRIORITY

This application claims the benefit of priority under 35 U.S.C. §119(a) from a Korean Patent Application filed in the Korean Intellectual Property Office on Feb. 1, 2008 and assigned Serial No. 2008-10667, the entire disclosure of which is hereby incorporated by reference in its entirety.

BACKGROUND OF THE INVENTION

1. Field of the Invention

The present invention relates to a method for estimating the contour of a video object. More particularly, the present invention relates to video compression and transmission technologies and their ability or lack thereof to distinguish the video object from a video background during video communications or a video call.

2. Description of the Related Art

The development of video compression and transmission technologies in rennet years has made video communications and/or video calls popular. Yet, there has been little progress in technically overcoming many of the adverse effects relating to the video communications.

One major adverse effect of video communications is that the place where a user is located is shown and thus his privacy is impaired because one receiving the communication can see a detailed background of the area surrounding the participant, such as their home or office area. To avert this problem and render the video communications active, a technique for distinguishing an object from a background in video communications and processing them separately is required. As the background can be replaced by another background, the place of the user is not known.

Many techniques have been proposed to date for distinguishing a video object from a video background. A popular technique is background modeling. When a fixed camera is used, pixels constant for a predetermined time are set as a background, as a user would be extremely likely to move, or at the very least, change facial expressions and speak, which would change the pixel values. Pixels whose values are rapidly changed with respect to the background are considered to be an object. Since the background may vary in some cases, it is updated every predetermined time, thus reducing sensitivity to changes.

Based on the assumption that in a video conference/communication the successive frames of the background are typically similar, the background modeling scheme effectively models the background and enables fast identification of the object using the modeled background. Thus, the background modeling considers all changes other than the background as the object, which is typically a person. Background modeling based on a Gaussian mixture model or kernel density estimation updates the background adaptively to instantaneous or continuous changes.

However, the above conventional background modeling scheme requires a fixed camera because movement of the camera would cause a shifted view that would make cause pixel changes in the background. Because modeling is carried out for each pixel in temporally adjacent frames, a change in pixel position causes errors. Even when the camera is displaced by one pixel, wrong information is mistaken for an object. In addition, the computation and storage capacities of the device may affect the modeling result considerably. Due to these limitations, the conventional technology is limited to a surveillance camera and computer-aided video communications. Accordingly, there exists a long-felt need in the art for an object segmentation method applicable to a future-generation communication technology, portable terminal-based video communications.

SUMMARY OF THE INVENTION

The invention provides a method of estimating the boundary between a background and a user object during portable terminal-based video communications or video call.

In accordance with an exemplary aspect of the present invention, there is provided a method for estimating a boundary between a background and a user object in a video, in which the user object is segmented from the background by estimating an initial object contour in a first video frame for object segmentation, color probability density functions are estimated for the user object and the background segmented from the first video frame, an edge strip with a predetermined width is generated based on an object contour of a previous frame in a current frame, a coherence probability density function of the edge strip is estimated, and the user object is segmented in the current frame by energy minimization.

BRIEF DESCRIPTION OF THE DRAWINGS

The above and other certain exemplary objects, features and advantages of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION

The matters defined in the description such as a detailed construction and elements are provided to assist a person of ordinary skill in the art with a comprehensive understanding of exemplary embodiments of the invention. Accordingly, those of ordinary skill in the art will recognize that various changes and modifications of the exemplary embodiments described herein can be made without departing from the spirit of the invention and the scope of the appended claims. Also, descriptions of well-known functions and constructions may have been omitted for clarity and conciseness when their inclusion would obscure appreciation of the subject matter of the present invention by a person of ordinary skill in the art.

Exemplary embodiments of the present invention provide a method for estimating the contour of a video object in real time by estimating the boundary between the video object and a video background and thus distinguishing them from each other in a video with a variable background during portable terminal-based video communications or video call. In the present invention, an object typically refers to a user participating in video communications or a video call. In a non-limiting general overview of one possible way the present invention may be practiced, first, an initial object contour is estimated in a first frame and probability density functions are estimated based on the colors of an object and a background that have been distinguished from each other. Then, an edge strip including the edge of the user object is set to use a spatio-temporal correlation for the next frame. Finally, the video is segmented into the object and the background by minimizing an energy function through summation of the colors, the edge strip, and smoothness.

Figure 1:
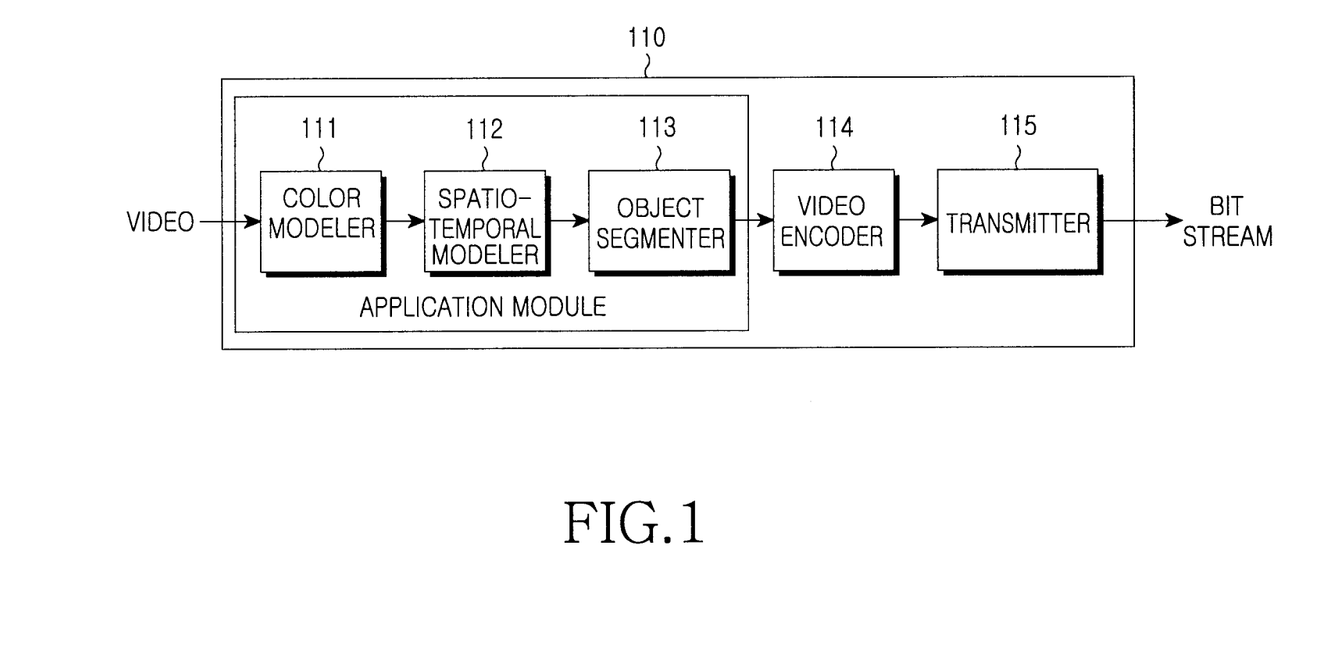
FIG. 1 is a block diagram of an apparatus for estimating the contour of a video object according to an exemplary embodiment of the present invention.

FIG. 1 is a block diagram of an apparatus for estimating the contour of a video object according to one exemplary embodiment of the present invention. The video object contour estimation apparatus includes a color modeler, a spatio-temporal modeler, and an object segmenter, for object segmentation in a video transmission apparatus, to be described herein below.

Referring now to FIG. 1, a transmission apparatus 110 includes a color modeler 111 for estimating color probability density functions using the colors of an initially segmented object and background, a spatio-temporal modeler 112 for estimating a coherence probability density function based on a spatio-temporal correlation, an object segmenter 113 for segmenting the object through energy minimization, a video encoder 114 for encoding video information, and a transmitter 115 for transmitting a video bit stream. The transmission apparatus 110 may comprise, for example, any portable mobile device, including but in no way limited to portable phones, Personal Digital Assistants (PDA), and smart phones, or fixed communication devices such as laptops and desktops, for transmitting and receiving video information over a communication network and carrying out video communications with other FIG. 2 is a flowchart illustrating exemplary steps of a method for estimating the contour of a video object according to an exemplary embodiment of the present invention.

Figure 2:
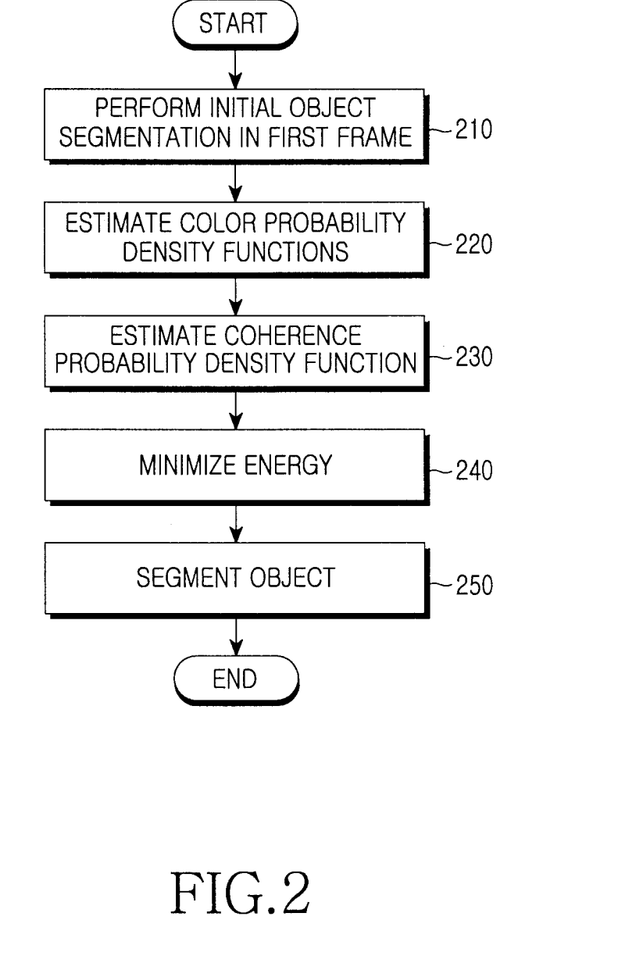
FIG. 2 is a flowchart illustrating a method for estimating the contour of a video object according to an exemplary embodiment of the present invention.

Referring now to FIG. 2, the contour of the video object is initially estimated in a first video frame in step 210. In accordance with an exemplary embodiment of the present invention, for the initial object contour estimation, energy minimization is repeated and a GrabCut algorithm requiring user interaction is used. For details of the GrabCut algorithm, see C. Rother, V. Kolmogorov, and A. Black, "GrabCut-interactive foreground extraction using iterated graph cuts" in ACM Transactions on Graphics, 2004, vol. 23 no. 3, pp. 309-314, which is hereby incorporated by reference in its entirety as background material.

Figure 3:
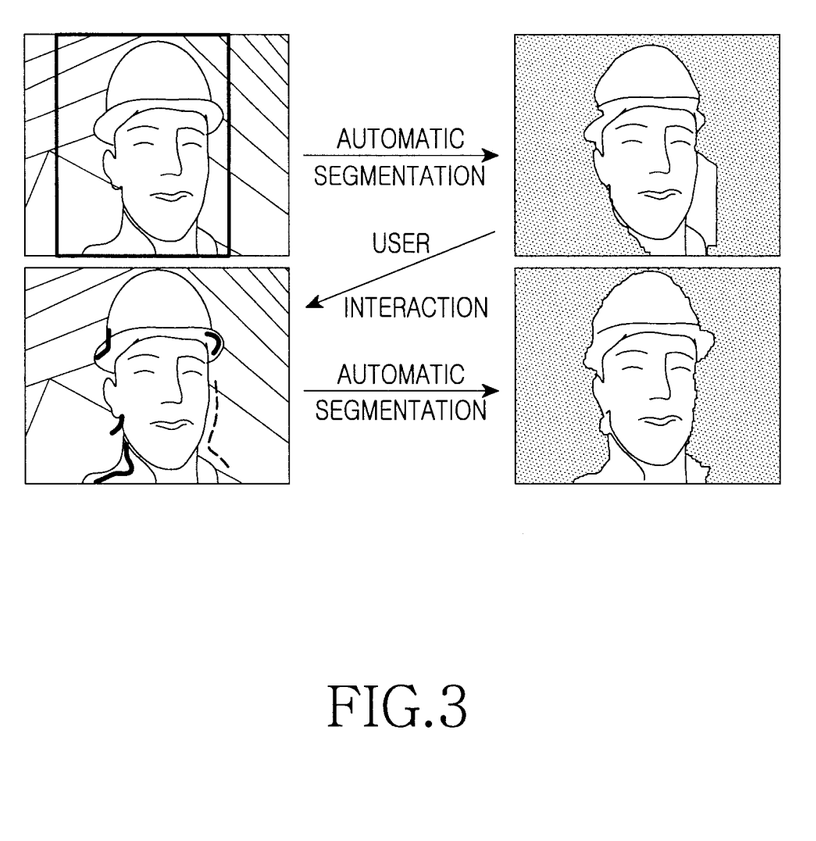
FIG. 3 is a diagram sequentially illustrating an initial object segmentation operation in the video object contour estimation method according to an exemplary embodiment of the present invention.

FIG. 3 is a diagram illustrating an initial object segmentation operation such as in FIG. 2 and sequential steps in the video object contour estimation method according to an exemplary embodiment of the present invention. In the illustrated case of FIG. 3, a first 'Foreman' video frame is subject to initial object segmentation using the GrabCut algorithm.

Referring now to FIG. 3, a user selects a rough square including an object, for object segmentation. Then a temporary label is allocated to each pixel by an iterated minimization scheme. The temporary label represents whether or not the pixel belongs to the object or the background. If the temporary label is not correct, a further user intervention is needed. In this case, the user can touch around the contour of the object with a pixel brush in an intended manner and the energy minimization continues. The initial object segmentation can be performed by the GrabCut algorithm.

Referring back to FIG. 2 again, color probability density functions are estimated for the segmented object and background in step 220. Colors are represented in (R, G, B) space according to this particular embodiment of the present invention. Let the pixel set of the object be denoted by $M_1$, the pixel set of the background be denoted by $M_0$, and a three-dimensional vector representing the color of a pixel p be denoted by $x_p$. Then, probability density functions can be estimated for the object and the background by equation (1) based on $M_0$ and $M_1$ without parameters.

$$p_{color}(x \mid M_\alpha) = \frac{1}{h^d |M_\alpha|} \sum_{p \in M_\alpha} K\left(\frac{x - x_p}{h}\right), \quad \alpha = 0, 1 \quad (1)$$

wherein K denotes a kernel function, h denotes a kernel bandwidth, d denotes the dimension of x, $M_\alpha$ denotes a set of pixels, and $|M_\alpha|$ denotes the number of pixels within $M_\alpha$. $\alpha$ denoting the label is 0 if the label is the background and 1 if the label is the object. d is 3 in the present invention.

In accordance with an exemplary embodiment of the present invention, a multivariate Epanechinikov kernel (B. W. Silverman, "Density Estimation for Statistics and Data Analysis", in Champman and Hall, 1986) is used, and hereby incorporated by reference as background material, and expressed as $$K(x) = \begin{cases} \frac{1}{2} C_d^{-1}(d+2)(1 - x^t x) & \text{if } x^t x < 1 \\ 0 & \text{otherwise} \end{cases} \quad (2)$$

where $C_d$ denotes the volume of a d-dimensional area ($C_1$=2, $C_2$=$\pi$, and $C_3$=4$\pi$/3). The Epanechinikov kernel, which is radially symmetric and uni-modal, offers the benefit of faster computation than the Gaussian kernel. In order to reduce computational complexity, the color density functions of equation (1) are calculated once and stored in a look-up table.

Figure 4A:
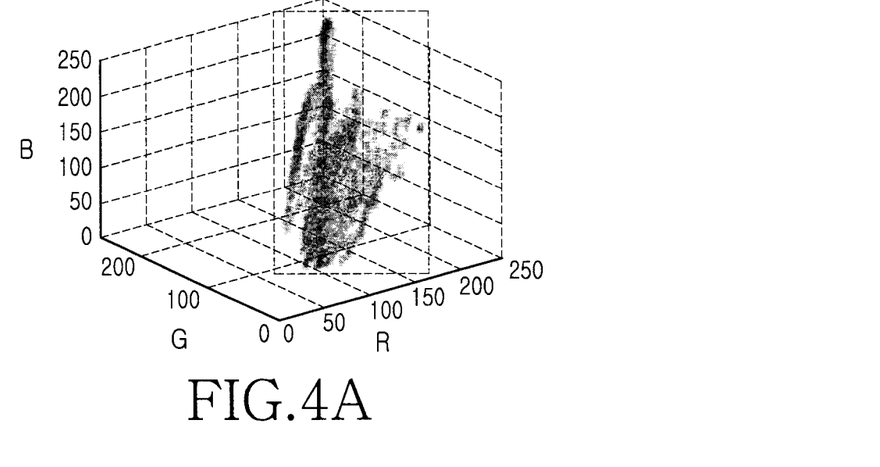
FIGS. 4A and 4B illustrate exemplary color probability density functions in three-dimensional coordinates in the video object contour estimation method according to an exemplary embodiment of the present invention.
Figure 4B:
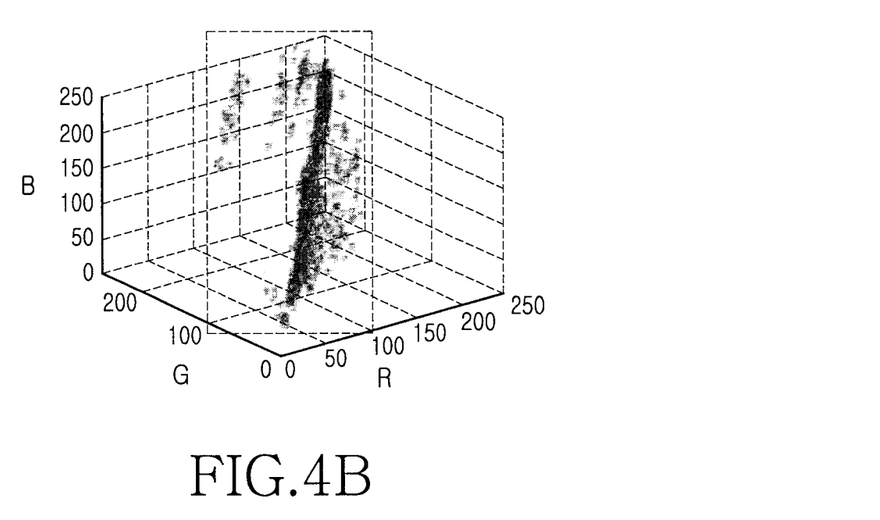

FIGS. 4A and 4B illustrate exemplary color probability density functions in three-dimensional coordinates in the video object contour estimation method according to an exemplary embodiment of the present invention. More specifically, FIG. 4A illustrates the color probability density function of the object in the first 'Foreman' video frame and FIG. 4B illustrates the color probability density function of the background in the first 'Foreman' video frame. In FIGS. 4A and 4B, the luminance of each point indicates a probability value.

Referring back to FIG. 2, at step 230 a coherence probability density function is estimated, taking into account the fact that the object is usually in similar positions in successive frames, in addition to the color information estimated in step 220. Therefore, it is preferable that an object strip is generated close to the object contour of a previous frame in a current frame. The concept of an object strip effectively reduces computational complexity because of the object contour characteristic of spatio-temporally successive video frames. The object trip is generated to have a certain width along an object boundary of a previous frame.

Figure 5A:
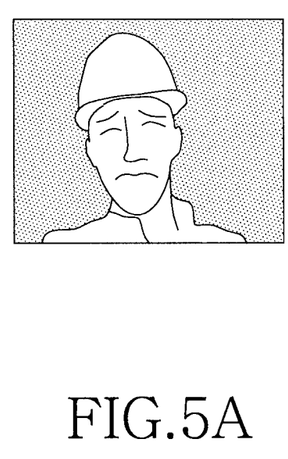
FIGS. 5A, 5B and 5C illustrate an edge strip in the video object contour estimation method according to an exemplary embodiment of the present invention.
Figure 5B:
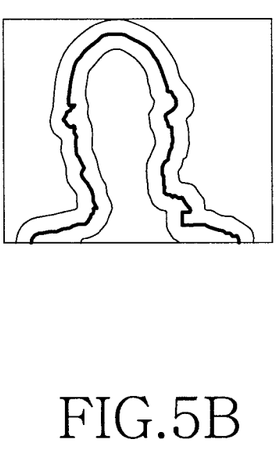

FIG. 5A illustrates an example of an object segmented from a 'Foreman' video and FIG. 5B illustrates an exemplary object strip following an object contour according to an exemplary embodiment of the present invention. For instance, the object strip illustrated in FIG. 5B can be created from the segmented object illustrated in FIG. 5A.

Figure 5C:
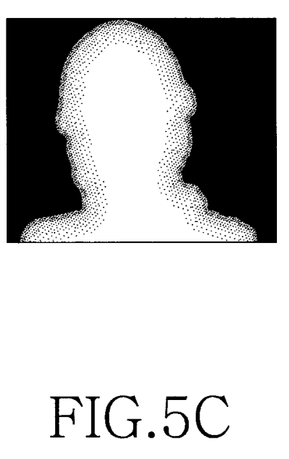

If the object slightly moves (makes a small motion), the object contour will be similar in the current and next frames and the object is highly probable to be within the strip. Hence, an a priori probability of a pixel within the object strip belonging to the object is estimated based on a spatio-temporal coherence. FIG. 5C illustrates a priori probability density function represented as pixel brightness. Referring to FIG. 5C, the brightness of each pixel represents the probability of the pixel belonging to the object. Let the binary label of an image in frame t be denoted by $\alpha^t$. Then $\alpha_p^t$ of pixel p is 1 when pixel p belongs to the object and 0 when pixel p belongs to the background. The a priori probability density function of the pixels of the edge strip is given as $$p_{cohere}(\alpha_p^t = 1 \mid \alpha^{t-1}) = \begin{cases} 0.5 + \dfrac{d_p}{w} & \text{if } \alpha_p^{t-1} = 1 \\ 0.5 - \dfrac{d_p}{w} & \text{if } \alpha_p^{t-1} = 0 \end{cases} \quad (3)$$

where w denotes the width of the edge strip and $d_p$ denotes the shortest distance from the contour of the object in the previous frame (t−1) to pixel $$p\left(0 \le d_p \le \frac{w}{2}\right).$$

When pixel p is farther outward from the contour of the object, $p_{cohere}(\alpha_p^t=1\mid\alpha^{t-1})$ gets smaller.

The width of the strip w is determined, taking into account both segmentation accuracy and computational complexity. If w is too large, a large number of pixels are classified, thus taking a long processing time. On the contrary, if w is too small, when the object moves fast, the object contour can be placed outside the edge strip.

Therefore, according to this example, the width of the strip w is determined based on the motion vectors of blocks that are on the object contour. The previous frame (t−1) is divided into 16×16 blocks. It should be understood that the 16×16 may comprise various other divisions. If one block is on the object contour, the motion vector of the current frame t is calculated by a 'three-step search' algorithm. To eliminate values beyond a predetermined level, the median motion vector v of the blocks on the contour are calculated. Finally, w is set in proportion to the absolute values of v by equation (4).

$$w = w_{min} + \|v\| \quad (4)$$

where $w_{min}$ denotes the minimum width of the edge strip, preferably 8.

In addition, the median motion vector v is considered to be the overall motion vector of the object from the previous frame (t−1) to the current frame t. The edge strip is shifted according to the overall motion vector according to equation (5).

$$p_{cohere}(\alpha_p^t = 1 \mid \alpha^{t-1}) = \begin{cases} 0.5 + \dfrac{d_{p-v}}{w} & \text{if } \alpha_{p-v}^{t-1} = 1 \\ 0.5 - \dfrac{d_{p-v}}{w} & \text{if } \alpha_{p-v}^{t-1} = 0 \end{cases} \quad (5)$$

$$p_{cohere}(\alpha_p^t = 0 \mid \alpha^{t-1}) = 1 - p_{cohere}(\alpha_p^t = 1 \mid \alpha^{t-1})$$

Especially for a fast object, the shifted probability density function is more accurate than that described in equation (3). In other words, a probability density function calculated based on a total motion produces a more improved object segmentation result.

Referring again back to FIG. 2, in step 240, pixels within the edge strip are classified by energy minimization. Since the energy minimization applies only to the edge strip, not to the entire frame, computational complexity decreases remarkably. Meanwhile pixels outside the edge strip are classified as the background and pixels inside the edge strip are classified as the object.

For the energy minimization, it is preferable that three energy functions of color, coherence, and smoothness are used. The color energy function is computed by $$E_{color}(\alpha^t) = -\sum_{p \in S} \log p_{color}\left(x_p \mid M_{\alpha_p^t}\right) \quad (6)$$

where S denotes a set of the pixels of the edge strip. If pixel p is labeled or classified as $\alpha_p^t$, the color probability of equation (1) is high.

In a similar manner, the coherence energy function is given as $$E_{cohere}(\alpha^t) = -\sum_{p \in S} \log p_{cohere}(\alpha_p^t \mid \alpha^{t-1}) \quad (7)$$

Equation (7) uses the a priori probability density function of equation (5).

The smoothness energy function restricts adjacent pixels with similar intensities to the same label. For details, see Y. Boykov and M. Jolly, "Interactive graph cuts for optimal boundary and region segmentation of objects in N-D images" in Proc. Int. Conf. on Computer Vision, July 2001, vol. 1, pp. 105-112) and incorporated by reference herein as background material.

The smoothness energy function is computed by $$E_{smooth}(\alpha^t) = -\sum_{\substack{(p,q)\in N \\ \alpha_p \ne \alpha_q}} \frac{1}{\|p-q\|} \exp\left(-\frac{(z_p - z_q)^2}{2\sigma^2}\right) \quad (8)$$

where N denotes a set of adjacent pixel pairs in eight directions, $z_p$ denotes the intensity (data size) of pixel p computed from the color $x_p$, and $\sigma$ denotes the standard deviation of intensities.

A total energy function is the sum of the above three energy functions, given as $$E(\alpha^t) = E_{color}(\alpha^t) + E_{cohere}(\alpha^t) + E_{smooth}(\alpha^t) \quad (9)$$

In accordance with an exemplary embodiment of the present invention, a graph cut technology is used for energy minimization. For details, see Y. Boykov and V Kolmohorov, "An experimental comparison of min-cut/max-flow algorithms for energy minimization in vision", IEEE Trans. Pattern Analysis and Machine Intelligence, vol. 26, no. 9, pp. 1124-1137, September 2004 and is incorporated by reference herein as background material. A graph G represents a node set V and an edge set E. The node set V is composed of pixels and labels. In this case, two edge types are set. An edge of one edge type is connected to a pixel and its label, and has an edge intensity determined according to the color energy function of equation (6) and the coherence energy function of equation (7). An edge of the other edge type is connected to two adjacent pixels and has an edge intensity determined by the smoothness energy function of equation (8). The min-cut of a weight graph enables optimal segmentation of an object from a background.

After the object segmentation in each frame, it is determined whether the colors of the pixels of the edge strip match to the color probability density functions described by equation (1). If 7% or more pixels have a probability of 0 in the two color probability density functions, the color probability density functions are updated. When the color probability density functions are updated for frame $t_k$ (k=1, 2, ...), the colors of three previous frames $t_{k-1}$, $t_{k-2}$, and $t_{k-3}$ are used in order to take into account previous samples together with new samples.

Figure 6A:
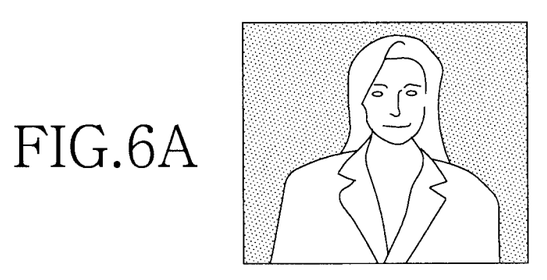
FIGS. 6A, 6B and 6C illustrate exemplary frames resulting from the video object contour estimation operation according to an exemplary embodiment of the present invention.
Figure 6B:
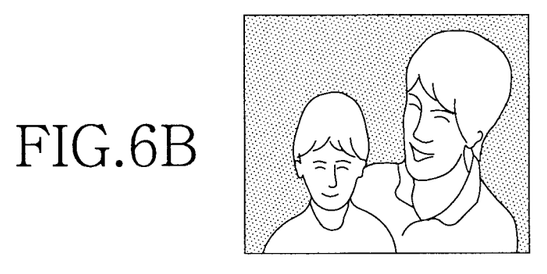
Figure 6C:
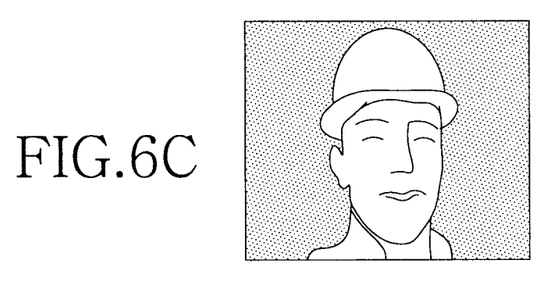

FIGS. 6A, 6B and 6C illustrate exemplary frames resulting from the video object contour estimation operation according to an exemplary embodiment of the present invention. In FIGS. 6A, 6B and 6C, videos of Akiyo, Mother and Daughter, and Foreman are illustrated, respectively.

Figure 7A:
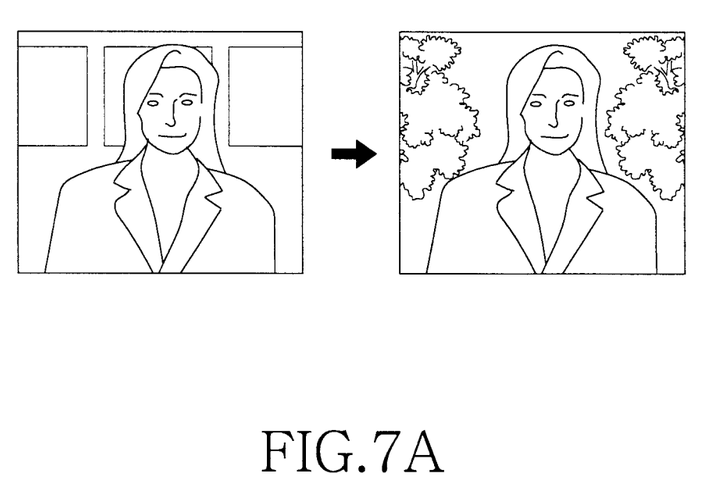
FIGS. 7A and 7B illustrate exemplary video images whose backgrounds are replaced with others in the video object contour estimation method according to an exemplary embodiment of the present invention.
Figure 7B:
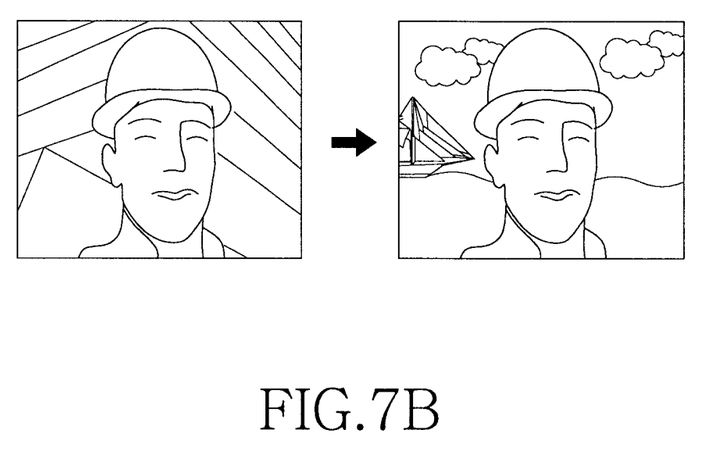

FIGS. 7A and 7B illustrate exemplary video images whose backgrounds are replaced with others in the video object contour estimation method according to an exemplary embodiment of the present invention. A background is replaced with another background by object and background segmentation during video communications in accordance with the exemplary embodiment of the present invention. The present invention has an excellent performance in terms of background changes and object motions. In addition, the coherence probability density function is calculated only for an area promising as an object based on a spatio-temporal coherence, not for an entire frame. Therefore, an advantage of the invention is that the computation volume is decreased.

As is apparent from the above description, the present invention provides a method for distinguishing an object from a background by estimating the boundary between them in a video during video communications. Advantageously, the present invention copes effectively with a complex background, movement-caused changes in a background, and the movement of an object, to thereby distinguish the object from the background. Furthermore, since the computation of object contour estimation is simple, the object and the background can be segmented in real time.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for estimating a boundary between a background and a user object in a video, comprising:
    (a) segmenting a user object from a background by estimating an initial contour of the user object in a first video frame for object segmentation;
    (b) estimating color probability density functions for the user object and the background that have been segmented from the first video frame;
    (c) generating an edge strip having a predetermined width based on an object contour of a previous frame in a current frame and estimating a coherence probability density function of the edge strip based on spatio-temporal correlation of the current video frame; and
    (d) segmenting the user object in the current frame by energy minimization.

2. The method of claim 1, wherein the width of the edge strip is calculated using a median motion vector of motion vectors of blocks that are on the object contour of the previous frame according to equation (12), $$w = w_{min} + \|v\| \quad (12)$$

where $w_{min}$ denotes a minimum width of the edge strip and v denotes the median motion vector.

3. The method of claim 2, wherein the motion vector of each block is calculated using a three-step search algorithm.

4. The method of claim 2, wherein the coherence probability density function estimation comprises computing the coherence probability density function according to equation (13), $$p_{cohere}(\alpha_p^t = 1 \mid \alpha^{t-1}) = \begin{cases} 0.5 + \dfrac{d_p}{w} & \text{if } \alpha_p^{t-1} = 1 \\ 0.5 - \dfrac{d_p}{w} & \text{if } \alpha_p^{t-1} = 0 \end{cases} \quad (13)$$

where $\alpha^t$ denotes a label of an image in frame t, $\alpha^{t-1}$ of pixel p is 1 if pixel p belongs to the object and 0 if pixel p belongs to the background, w denotes the width of the edge strip, and $d_p$ denotes a shortest distance from the contour of the object in the previous frame (t−1) to pixel $$p\left(0 \leq d_p \leq \dfrac{w}{2}\right).$$

5. The method of claim 2, wherein the coherence probability density function estimation comprises computing the coherence probability density function by shifting the edge strip of the current frame using the median motion vector of the current frame according to equation (14), $$p_{cohere}(\alpha_p^t = 1 \mid \alpha^{t-1}) = \begin{cases} 0.5 + \dfrac{d_{p-v}}{w} & \text{if } \alpha_{p-v}^{t-1} = 1 \\ 0.5 - \dfrac{d_{p-v}}{w} & \text{if } \alpha_{p-v}^{t-1} = 0 \end{cases} \quad (14)$$

where $\alpha^t$ denotes a label of an image in frame t, $\alpha^{t-1}$ of pixel p is 1 if pixel p belongs to the object and 0 if pixel p belongs to the background, w denotes the width of the edge strip, $d_p$ denotes a shortest distance from the contour of the object in the previous frame (t−1) to pixel $$p\left(0 \leq d_p \leq \dfrac{w}{2}\right),$$

and v denotes the median motion vector.

6. A method for estimating a boundary between a background and a user object in a video, comprising:

(a) segmenting a user object from a background by estimating an initial contour of the user object in a first video frame for object segmentation;
(b) estimating color probability density functions for the user object and the background that have been segmented from the first video frame;
(c) generating an edge strip having a predetermined width based on an object contour of a previous frame in a current frame and estimating a coherence probability density function of the edge strip; and
(d) segmenting the user object in the current frame by energy minimization, wherein the color probability density functions estimation in step (b) comprises computing the color probability density functions according to equation (10), $$p_{color}(x \mid M_\alpha) = \frac{1}{h^d |M_\alpha|} \sum_{p \in M_\alpha} K\left(\frac{x - x_p}{h}\right), \alpha = 0, 1 \quad (10)$$

where $M_\alpha$ denotes a set of pixels, $\alpha$ is 0 for the background and 1 for the user object, which means that $M_1$ is a set of object pixels and $M_0$ is a set of background pixels, $x_p$ denotes a three-dimensional vector indicating a color (R, G, B) of pixel p, K denotes a kernel function, h denotes a kernel bandwidth, d denotes the dimension of x, and $|M_\alpha|$ denotes the number of pixels within $M_\alpha$.

7. The method of claim 6, wherein the initial estimation of the contour of the user object in step (a) comprises estimating the initial object contour using a GrabCut algorithm based on user interaction.

8. The method of claim 6, wherein the kernel comprises a multivariate Epanechinikov kernel defined as equation (11), $$K(x) = \begin{cases} \frac{1}{2} C_d^{-1}(d+2)(1 - x^t x) & \text{if } x^t x < 1 \\ 0 & \text{otherwise} \end{cases} \quad (11)$$

where $C_d$ denotes the volume of a d-dimensional area ($C_1=2$, $C_2=\pi$, and $C_3=4\pi/3$) and d denotes the dimension of x.

9. The method of claim 6, further comprising storing the color probability density functions after estimating the color probability density functions.

10. The method of claim 9, wherein the color probability density functions are stored in a look-up table.

11. The method of claim 6, further comprising after segmenting the object in the current frame, comparing the color probability density functions of the object and the background for pixels included in the edge strip and updating the color probability density functions if 7% or more of the pixels have a probability of 0 in the color probability density functions.

12. The method of claim 11, wherein updating the color probability density functions comprises updating colors of three previous frames.

13. A method for estimating a boundary between a background and a user object in a video, comprising:

(a) segmenting a user object from a background by estimating an initial contour of the user object in a first video frame for object segmentation;
(b) estimating color probability density functions for the user object and the background that have been segmented from the first video frame;
(c) generating an edge strip having a predetermined width based on an object contour of a previous frame in a current frame and estimating a coherence probability density function of the edge strip; and
(d) segmenting the user object in the current frame by energy minimization, wherein the energy minimization is performed using a color energy function, a coherence energy function, and a smoothness energy function according to equation (15), $$E(\alpha^t) = E_{color}(\alpha^t) + E_{cohere}(\alpha^t) + E_{smooth}(\alpha^t) \quad (15)$$

where $E_{color}(\alpha^t)$ denotes the color energy function, $E_{cohere}(\alpha^t)$ denotes the coherence energy function, and $E_{smooth}(\alpha^t)$ denotes the smoothness energy function.

14. The method of claim 13, wherein the color energy function is computed according to equation (16), $$E_{color}(\alpha^t) = -\sum_{p \in S} \log p_{color}\left(x_p \mid M_{\alpha_p^t}\right) \quad (16)$$

where S denotes a set of the pixels of the edge strip, $x_p$ denotes a three-dimensional vector indicating a color (R, G, B) of pixel p, $M_\alpha$ denotes a set of pixels, $\alpha^t$ denotes a label of an image in frame t, and $\alpha_p^t$ of pixel p is 1 if pixel p belongs to the object and 0 if pixel p belongs to the background.

15. The method of claim 13, wherein the coherence energy function is computed by equation (17), $$E_{cohere}(\alpha^t) = -\sum_{p \in S} \log p_{cohere}(\alpha_p^t \mid \alpha^{t-1}) \quad (17)$$

where S denotes a set of the pixels of the edge strip, $\alpha^t$ denotes a label of an image in frame t, and $\alpha_p^t$ of pixel p is 1 if pixel p belongs to the object and 0 if pixel p belongs to the background.

16. The method of claim 13, wherein the smoothness energy function is computed by equation (18), $$E_{smooth}(\alpha^t) = -\sum_{\substack{(p,q) \in N \\ \alpha_p \neq \alpha_q}} \frac{1}{\|p - q\|} \exp\left(-\frac{(z_p - z_q)^2}{2\sigma^2}\right) \quad (18)$$

where $\alpha^t$ denotes a label of an image in frame t, $\alpha_p^t$ of pixel p is 1 if pixel p belongs to the object and 0 if pixel p belongs to the background, N denotes a set of adjacent pixel pairs in eight directions, $z_p$ denotes the intensity (data size) of pixel p computed from color $x_p$, $z_q$ denotes the intensity (data size) of pixel q computed from color $x_p$, and $\sigma$ denotes the standard deviation of intensities.

* * * * *